US010569814B2

(12) United States Patent
Hulstein et al.

(10) Patent No.: US 10,569,814 B2
(45) Date of Patent: Feb. 25, 2020

(54) LIFT AXLE AUXILIARY SUSPENSION SYSTEMS

(71) Applicant: Link Mfg., Ltd., Sioux Center, IA (US)

(72) Inventors: Gregory Wayne Hulstein, Sioux Center, IA (US); Joel D. Van Den Brink, Rock Valley, IA (US); Michael S. Wetter, Orange City, IA (US)

(73) Assignee: Link Mfg., Ltd., Sioux Center, IA (US)

( * ) Notice: Subject to any disclaimer, the term of this patent is extended or adjusted under 35 U.S.C. 154(b) by 221 days.

(21) Appl. No.: 15/701,369

(22) Filed: Sep. 11, 2017

(65) Prior Publication Data

US 2019/0077468 A1 Mar. 14, 2019

(51) Int. Cl.
*B62D 61/12* (2006.01)
*B60G 9/00* (2006.01)
*B62D 33/077* (2006.01)
*B62D 21/20* (2006.01)
*B60G 17/02* (2006.01)
*B62D 21/02* (2006.01)
*B62D 33/063* (2006.01)

(52) U.S. Cl.
CPC ............. *B62D 33/077* (2013.01); *B60G 9/00* (2013.01); *B60G 17/02* (2013.01); *B62D 21/02* (2013.01); *B62D 21/20* (2013.01); *B62D 61/12* (2013.01); *B60G 2204/421* (2013.01); *B60G 2204/4302* (2013.01); *B60G 2300/026* (2013.01); *B60G 2300/402* (2013.01); *B62D 33/0633* (2013.01)

(58) Field of Classification Search
CPC ........ B62D 61/00; B62D 61/10; B62D 61/12; B62D 61/125; B60G 9/00; B60G 2300/402
See application file for complete search history.

(56) References Cited

U.S. PATENT DOCUMENTS 4,856,814 A * 8/1989 Jones ..................... B62D 7/144
280/86.5
5,230,528 A * 7/1993 Van Raden ............ B62D 61/12
280/124.116

(Continued)

OTHER PUBLICATIONS

Link Manufacturing Ltd., Air Control Kit (1350-1004), Installation Instructions Parts List; Jan. 14, 2016, 4 pages.

*Primary Examiner* — Barry Gooden, Jr.
(74) *Attorney, Agent, or Firm* — Perkins Coie LLP (57) ABSTRACT

Lift axle systems for use with trucks and other heavy duty vehicles are described herein. In some embodiments, lift axle systems configured in accordance with the present technology include upper and lower control arms on each side of the vehicle that operably couple an axle to a support system attached to the vehicle chassis. The upper control arm has a first end portion pivotally attached to a support system bracket at an upper bracket location, and a second end portion pivotally attached to the axle at an upper axle location. The lower control arm has a first end portion pivotally attached to the support system bracket at a lower bracket location, and a second end portion pivotally attached to the axle at a lower axle location. In some embodiments, the upper and lower bracket locations lie in a vertical plane that extends parallel to the vertical and longitudinal axes of the vehicle, and the upper axle location is spaced apart from the lower axle location in a lateral direction that extends parallel to the lateral axis of the vehicle.

20 Claims, 5 Drawing Sheets

(56) References Cited

U.S. PATENT DOCUMENTS

| | | | |
|---|---|---|---|
| 5,403,031 A | 4/1995 | Gottschalk et al. | |
| 5,505,481 A * | 4/1996 | Vandenberg | B60G 11/27 |
| | | | 280/124.157 |
| 6,073,946 A | 6/2000 | Richardson | |
| 6,073,947 A | 6/2000 | Gottschalk et al. | |
| 6,311,993 B1 | 11/2001 | Hulstein et al. | |
| 6,398,236 B1 | 6/2002 | Richardson | |
| 6,808,035 B1 * | 10/2004 | Keeler | B60G 7/02 |
| | | | 180/197 |
| 6,880,839 B2 | 4/2005 | Keeler et al. | |
| 7,789,405 B2 * | 9/2010 | Lie | B60G 9/00 |
| | | | 267/293 |
| 8,403,346 B2 * | 3/2013 | Chalin | B60G 9/00 |
| | | | 280/43.18 |
| 8,573,611 B1 * | 11/2013 | Jensen | B62D 61/12 |
| | | | 280/86.5 |
| 9,352,628 B2 | 5/2016 | Barton et al. | |
| 9,688,318 B1 | 6/2017 | Van et al. | |
| 2004/0178594 A1 * | 9/2004 | Keeler | B62D 61/12 |
| | | | 280/86.5 |
| 2004/0256820 A1 * | 12/2004 | Chalin | B60G 9/00 |
| | | | 280/86.5 |
| 2006/0157309 A1 * | 7/2006 | Chalin | B60G 9/00 |
| | | | 188/266 |
| 2009/0206570 A1 * | 8/2009 | Strong | B62D 61/12 |
| | | | 280/86.5 |
| 2013/0087984 A1 * | 4/2013 | Gottschalk | B60G 9/02 |
| | | | 280/124.116 |
| 2015/0336436 A1 * | 11/2015 | Barton | B60G 9/02 |
| | | | 280/86.5 |
| 2016/0046163 A1 * | 2/2016 | Layne | B62D 61/12 |
| | | | 280/86.5 |
| 2017/0016757 A1 * | 1/2017 | Strong | G01G 19/08 |

* cited by examiner

LIFT AXLE AUXILIARY SUSPENSION SYSTEMS

TECHNICAL FIELD

The present disclosure relates generally to lift axle auxiliary suspension systems for trucks, trailers, and other heavy-lift vehicles.

BACKGROUND

Many heavy duty trucks carry a wide range of loads depending on the amount of cargo or materials they may be carrying. To carry the full range of loads, some trucks use one or more non-drive rear axles in conjunction with one or more drive axles. A non-drive rear axle may be needed for a variety of reasons, such as to comply with suspension and tire load ratings, bridge laws, etc. When the truck is unloaded, the non-drive axle is just "along for the ride," since it is not needed to carry any load in that condition. For this reason, many trucks include non-drive axles that can be lifted off of the ground and into a stored position (the "lifted position" or "raised position") when not needed. This type of axle is often referred to as a "lift axle," "liftable axle," "auxiliary axle" and/or an "auxiliary suspension system." By raising the lift axle when the vehicle is lightly loaded, wear on the lift axle tires can be reduced and fuel economy can be increased due to the absence of rolling resistance from the lift axle tires.

Lift axles can be installed ahead of or behind the drive axles on a straight truck or tractor. If a lift axle is positioned ahead of the drive axle, the lift axle is referred to as a "pusher." If the lift axle is positioned behind the drive axle, it is referred to as a "tag." Lift axles can also be installed ahead of or behind an axle or tandem axles on an articulating trailer. In addition, there are both steerable and non-steerable lift axles. As the name implies, the wheels on a non-steerable lift axle cannot turn left or right, and as a result non-steerable lift axles need to be raised prior to turning a tight corner or the tires will scuff and impose high lateral stresses on the wheels and other chassis components. In contrast, steerable lift axles include wheels that caster so they turn and can remain in contact with the ground during tight turning.

Lift axle systems typically include an axle that is movably coupled to the chassis of the vehicle by one or more control arms on each side of the vehicle. The control arms provide lateral support for the axle, but enable the axle to be raised into the stored position when not in use. When a lift axle is in the lowered or active position, the load on the lift axle (commonly referred to as "sprung mass") is typically carried by one or more load springs. The load springs are often air springs, which typically include a flexible bellows that forms an air chamber that is inflated to extend the spring and carry the load. Many lift axles also employ additional air springs (commonly referred to as "lift springs" or "lift bags") that lift the axle into the stored position when the vehicle is in an unloaded or lightly loaded condition. Various lift axle systems and associated components are described in U.S. Pat. No. 5,403,031 to Gottschalk et al., U.S. Pat. No. 6,073,947 to Gottschalk et al., U.S. Pat. No. 6,311,993 to Hulstein et al., U.S. Pat. No. 6,880,839 to Keeler et al., U.S. Pat. No. 9,352,628 to Barton et al., and U.S. Pat. No. 9,688,318 to Wetter et al., each of which is incorporated herein by reference in its entirety.

DETAILED DESCRIPTION

The following disclosure describes various embodiments of lift axle systems for use with heavy duty trucks, trailers, and/or other vehicles, and associated methods of manufacture and use. Lift axle systems configured in accordance with the present technology can include upper and lower control arms on each side of the vehicle for movably attaching an auxiliary axle to a support structure mounted to the vehicle chassis. The upper control arm on each side of the vehicle can include a first end portion pivotally attached to the support structure at an upper bracket location, and a second end portion pivotally attached to the axle at an upper axle location. The corresponding lower control arm can similarly include a first end portion pivotally attached to the support structure at a lower bracket location, and a second end portion pivotally attached to the axle at a lower axle location. In some embodiments, the upper and lower bracket locations lie in a vertical plane that extends parallel to the vertical and longitudinal axes of the vehicle, while the upper axle location is laterally spaced apart from the lower axle location. The alignment of the upper and lower support structure bracket attachment locations enables the first end portions of the upper and lower control arms to be pivotally attached to a common bracket (e.g., a single "hanger bracket"), while the lateral spacing of the axle attachment locations provides enhanced axle support and stability. This control arm arrangement can also provide a favorable mounting arrangement for the associated axle lift springs.

Certain details are set forth in the following description and in FIGS. 1-4B to provide a thorough understanding of various embodiments of the present technology. In other instances, well-known structures, systems, materials and/or methods often associated with lift axles systems, heavy duty trucks and other vehicles, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these elements may be arbitrarily enlarged to improve legibility. In some instances, component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. Those of ordinary skill in the art will appreciate that further embodiments of the invention can be practiced without several of the details described below. In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1:
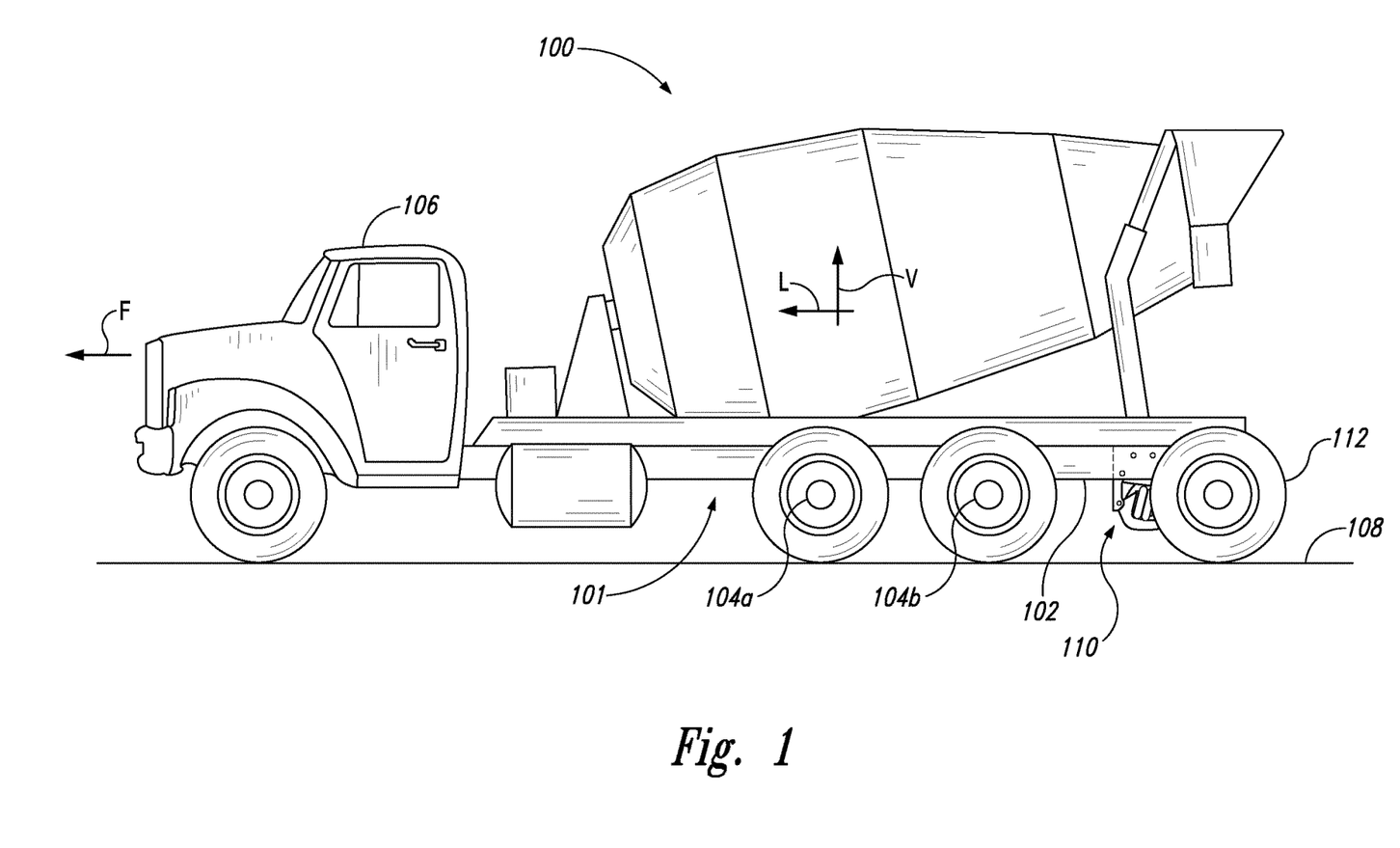
FIG. 1 is a side view of a vehicle having a lift axle system configured in accordance with an embodiment of the present technology.

FIG. 1 is a left side (driver side) view of a vehicle 100 having a lift axle system 110 configured in accordance with an embodiment of the present technology. The vehicle 100 includes a cab 106 mounted to a chassis 101. The chassis 101 has two laterally spaced-apart, longitudinally extending frame members 102, although only one frame member 102 can be seen in the side view of FIG. 1. In the illustrated embodiment, the lift axle system 110 is attached to the frame members 102 behind tandem axles 104a and 104b in a "tag" configuration. One or both of the tandem axles 104 can be drive axles. In other embodiments, the lift axle system 110 can be positioned between the cab 106 and the tandem axles 104 in a "pusher" configuration. The lift axle system 110 includes one or more wheels 112 rotatably mounted on opposite sides thereof. As described in greater detail below, in operation the lift axle system 110 can raise the wheels 112 off of the ground 108 when the additional support of the lift axle is not needed, and lower the wheels 112 into contact with the ground 108 as shown in FIG. 1 when the extra support of the lift axle system 110 is needed or desired.

For directional reference in the discussion that follows, it will be understood that the vehicle 100 is pointed in a forward direction F and is aligned with a longitudinal axis L. Additionally, it will be understood that a vertical axis V extends upwardly at a right angle to the longitudinal axis L, and that a lateral axis S (not shown in FIG. 1) extends horizontally transverse to the longitudinal axis L. Although the vehicle 100 is depicted as a concrete mixer for purposes of illustration, the lift axle systems described herein can be used with virtually any type of heavy duty vehicle including, for example, other types of trucks, trailers, etc., in both "tag" and "pusher" configurations, and with both steerable and non-steerable axles. Accordingly, the various embodiments of the present technology described herein are not limited to use with any particular type of vehicle or in any particular type of axle arrangement unless specifically noted otherwise herein.

Figure 2A:
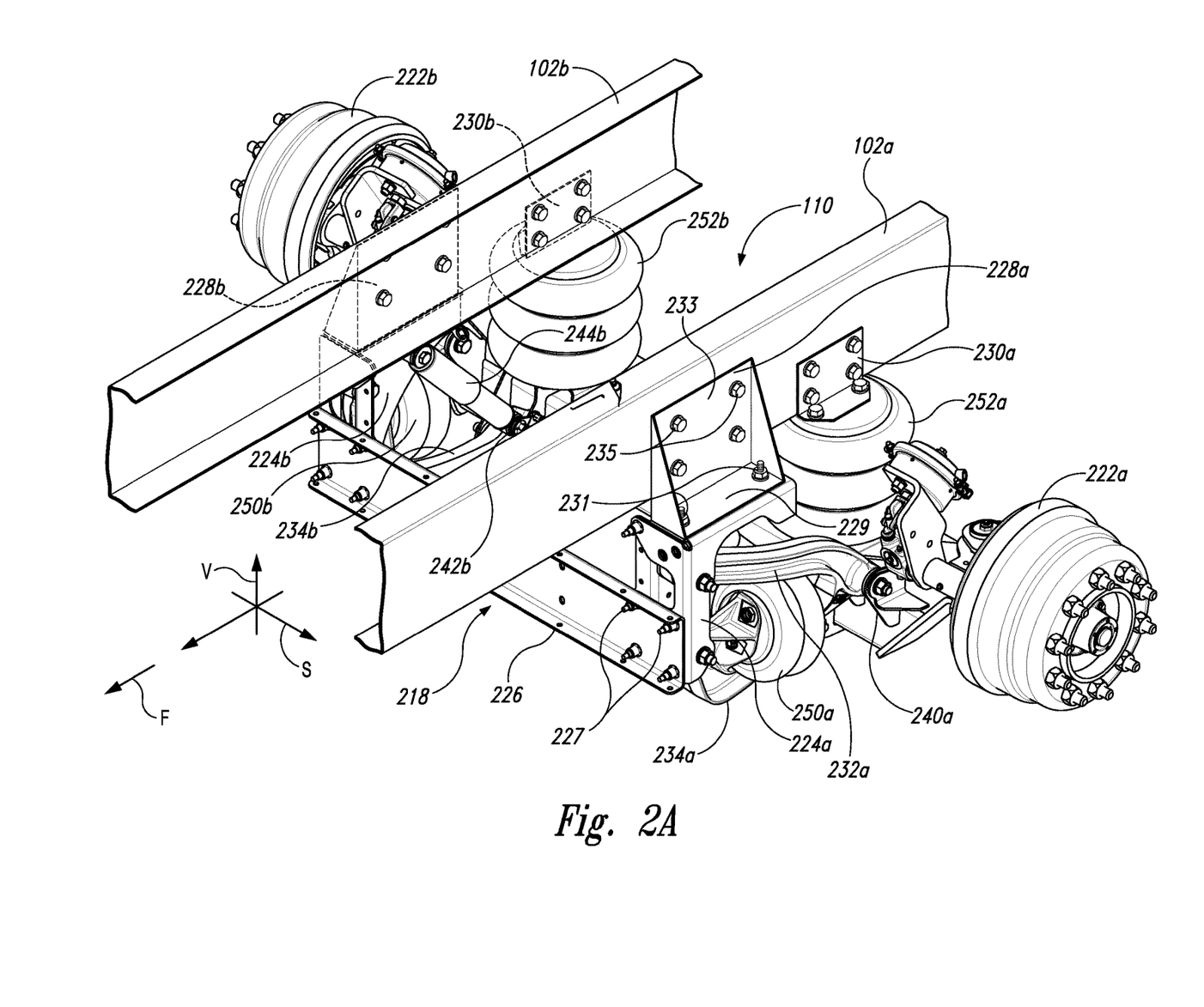
FIGS. 2A and 2B are top isometric and top views, respectively, of a lift axle system configured in accordance with an embodiment of the present technology.
Figure 2B:
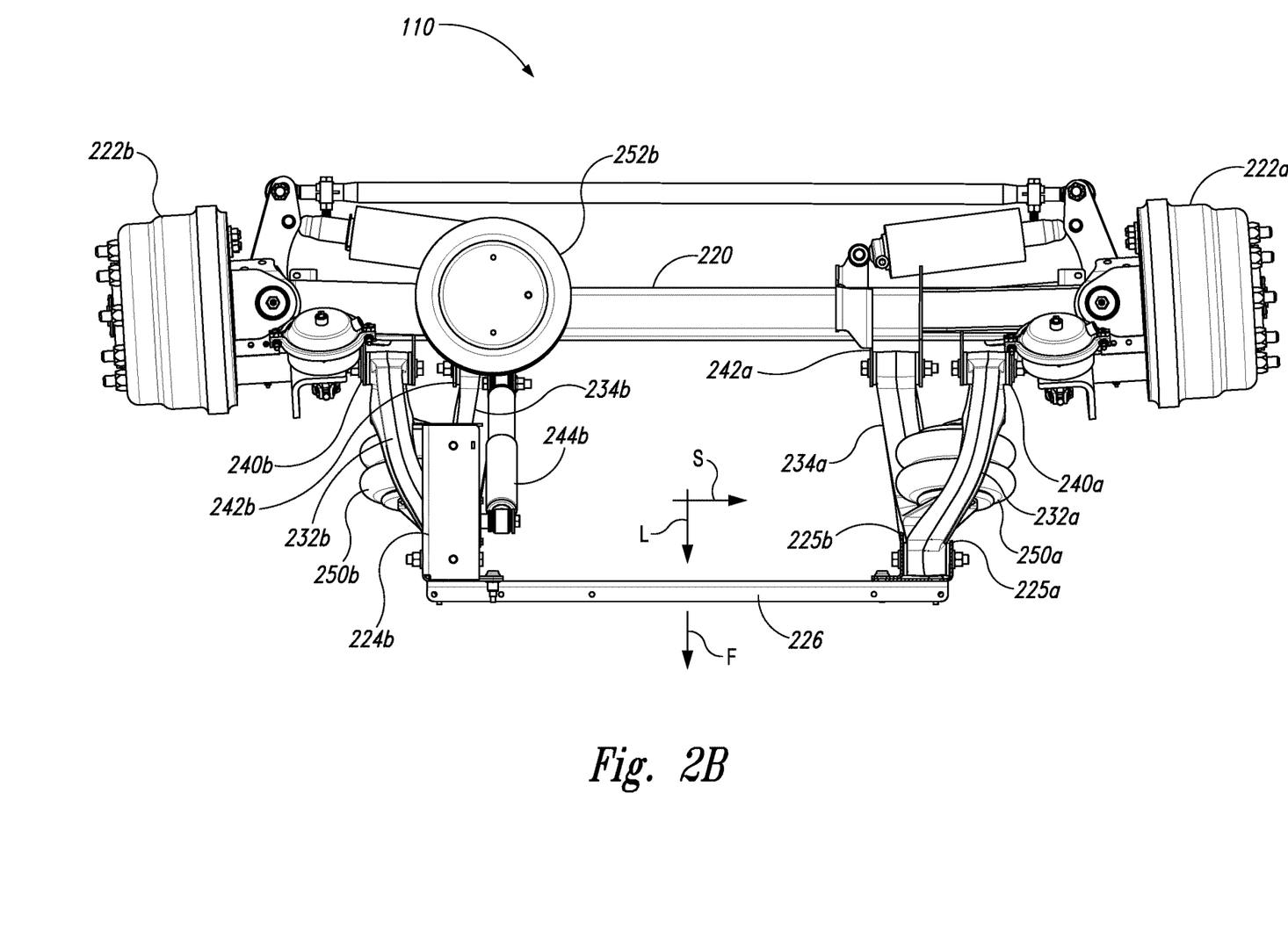

FIGS. 2A and 2B are isometric and top views, respectively, of the lift axle system 110 configured in accordance with an embodiment of the present technology. A number of components have been omitted from the right side of FIG. 2B for purposes of clarity. Referring to FIGS. 2A and 2B together, in the illustrated embodiment the lift axle system 110 includes an axle 220 movably coupled to a support system 218 by a first upper control arm 232a and a first lower control arm 234a on the left side (driver side) of the vehicle 100, and a second upper control arm 232b and a second lower control arm 234b on the right side (passenger side) of the vehicle 100. In the illustrated embodiment, the axle 220 is a steerable axle having left and right side hubs 222a and 222b, respectively, that are able to caster and are rotatably mounted to opposite end portions thereof in a conventional manner. Wheels (not shown in FIG. 2A or 2B) can be mounted to the hubs 222a, b in a conventional manner. In other embodiments, the axle 220 can be a non-steerable axle. The axle 220 includes a first upper fitting 240a and a first lower fitting 242a (e.g., clevis fittings) welded or otherwise fixedly attached to the axle 220 toward the left side thereof, and a second upper fitting 240b and a second lower fitting 242b fixedly attached to the axle 220 toward the right side thereof.

The support structure 218 includes a first hanger bracket 224a and a second hanger bracket 224b. In the illustrated embodiment, the hanger brackets 224 are mirror images of each other, and each includes a first vertically disposed sidewall 225a spaced apart from an opposing second vertically disposed sidewall 225b. Each of the hanger brackets 224a, b is fixedly attached to the corresponding frame rail 102a, b by means of a frame bracket 228. More specifically, in the illustrated embodiment each of the hanger brackets 224a, b can be secured to a horizontally disposed lower flange 229 of the corresponding frame bracket 228 by a plurality of bolts or other suitable fasteners 231. In other embodiments, the frame brackets 228a, b can include other features, such as additional flanges, fastener holes, fasteners, etc. for attachment to the hanger brackets 224a, b. An upstanding flange 233 of each of the frame brackets 228 can be fixedly attached to the corresponding frame rail 102a, b by a plurality of bolts or other suitable fasteners 235. The support structure 218 further includes a cross member 226 having opposing end portions that are fixedly attached to each of the hanger brackets 224 by a plurality of bolts (e.g., Huck bolts) or other suitable fasteners 227. The support structure 218 described above is provided by way of example only, and in other embodiments, the support structure 218 can include other brackets or other structural members for attaching the lift axle system 110 to the vehicle chassis. Such brackets can include, for example, one or more of the bracket configurations described in the patents and/or applications incorporated herein by reference.

In the illustrated embodiment, the lift axle system 110 further includes first and second lift springs 250a and 250b, respectively, for raising the axle 220, and first and second load springs 252a and 252b, respectively, for carrying vehicle loads on the axle 220. The first lift spring 250a is operably coupled between the first upper control arm 232a and the first lower control arm 234a, and the second lift spring 250b is similarly coupled between the second upper control arm 232b and the second lower control arm 234b. The first load spring 252a is operably coupled between the left side portion of the axle 220 and the first frame rail 102a in a conventional manner, and the second load spring 252b is similarly coupled between the right side portion of the axle 220 and the second frame rail 102b. In some embodiments, the lift springs 250a, b and the load springs 252a, b can be at least generally similar in structure and function to air springs known in the art for use with truck suspensions. Referring to the load springs 252a, b, for example, these can be convoluted air springs having two or more bellows comprised at least partially of rubber and constrained by one or more girdle hoops. The flexible bellows can extend between a top plate that is fixedly attached to a corresponding frame bracket 230a, b via, for example, one or more threaded studs and/or one or more blind threaded fastener holes (not shown), and a bottom plate (not shown) that provides a similar mounting arrangement for attaching the load spring 252a, b to the axle 220. In addition to the foregoing features, each of the load springs 252a, b can further include an air fitting (e.g., a fill-and-drain fitting) that permits pressurized air to flow into and out of the bellows in operation. The lift springs 250a, b can be at least generally similar in structure and function to the load springs 252a, b, and can also include air fittings that permit pressurized air to flow into and out of the bellows in operation. In other embodiments, the load springs 252a, b and/or the lift springs 252a, b can have other configurations that utilize internal pressure chambers for expansion and load carrying. In still further embodiments, it is contemplated that the lift axle systems described herein can be used with other types extensible/compressible members (e.g., mechanically extensible/compressible members) for raising/lowering the axle 220 and/or transmitting vehicle loads to the axle 220, without departing from the spirit or scope of the present disclosure.

In the illustrated embodiment, the lift axle system 110 further includes a first shock absorber 244a and a second shock absorber 244b. Each of the shock absorbers 244a, b includes a first end portion pivotally coupled to the corresponding hanger bracket 224a, b, and a second end portion pivotally coupled to the axle 220 proximate the corresponding lower axle fitting 242a, b. The first load spring 252a, the first shock absorber 244a, and an upper portion of the first hanger bracket 224a have been omitted from FIG. 2B for purposes of clarity. In some embodiments, the shock absorbers 244a, b are optional features that can be omitted. In other embodiments, the shock absorbers 244a, b can replaced by, for example, an air dampening system, such as an air dampening system disclosed in one or more of the patents or applications incorporated by reference herein.

Figure 3A:
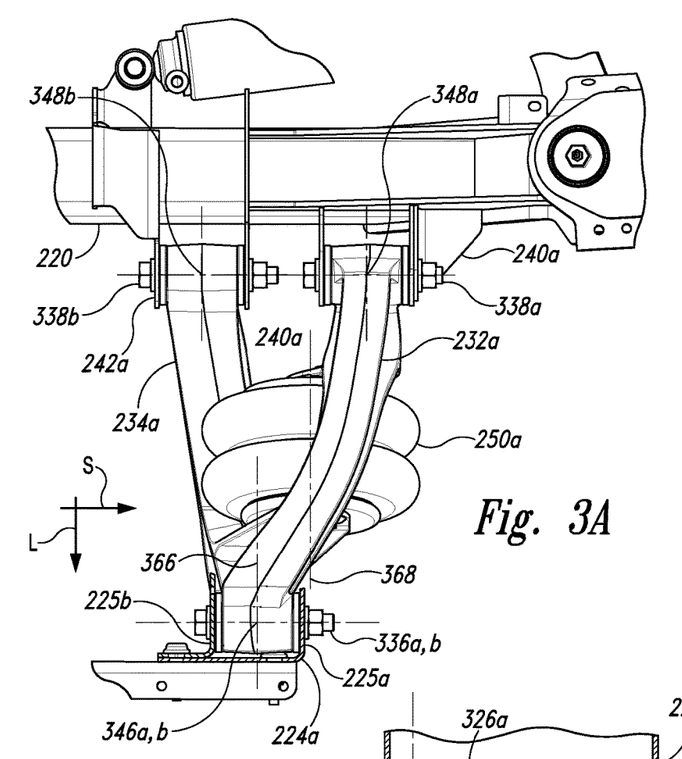
FIGS. 3A and 3B are enlarged top and side views, respectively, of a portion of the lift axle system of FIGS. 2A and 2B illustrating an arrangement of upper and lower control arms configured in accordance with an embodiment of the present technology.
Figure 3B:
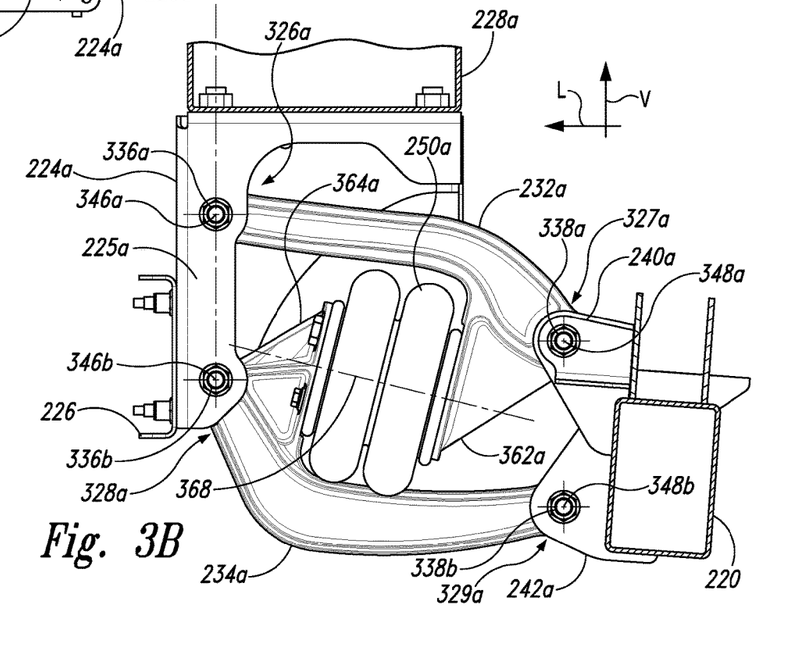

FIGS. 3A and 3B are enlarged top and side views, respectively, of a left-side portion of the lift axle system 110 illustrating the arrangement of the upper control arm 232a and the lower control arm 234a, in accordance with an embodiment of the present technology. Referring to FIGS. 3A and 3B together, a first end portion 326a of the upper control arm 232a is positioned between the opposing sidewalls 225a and 225b of the first hanger bracket 224a at an upper bracket location 346a, and is pivotally coupled thereto by a first pivot pin 336a (e.g., a bolt). Similarly, a first end portion 328a of the lower control arm 234a is positioned between the opposing sidewalls 225a and 225b at a lower bracket location 346b, and is pivotally coupled to the first hanger bracket 225a by a second pivot pin 336b. A second end portion 327a of the upper control arm 232a is received between opposing sidewalls of the upper axle fitting 240a at an upper axle location 348a, and is pivotally attached to the upper axle fitting 240a by a first pivot pin 338a (e.g., a bolt). A second end portion 329a of the lower control arm 234a is similarly received between the opposing sidewalls of the lower axle fitting 242a at a lower axle location 348b, and is pivotally attached to the lower axle fitting 242a by a second pivot pin 338b. It will be understood that second upper control arm 232b and the second lower control arm 234b are operably coupled to the axle 220 and the second hanger bracket 224b in a mirror image arrangement to that described above for the first upper control arm 232a and the first lower control arm 234a. Accordingly, the reader will appreciate that, given the symmetrical nature of the lift axle system 110, unless otherwise stated the descriptions of the components and systems on the left side of the lift axle system 110 apply equally to the components and systems on the right side.

As can be seen with reference to FIGS. 3A and 2A, in one aspect of the illustrated embodiment the upper and lower bracket locations 346a and 346b lie (or at least approximately lie) in a vertical plane 366 that extends parallel to the vertical axis V and the longitudinal axis L, and the upper axle location 348a is spaced apart from the lower axle location 348b in a transverse direction that extends parallel to the lateral axis S. Additionally, in the illustrated embodiment the upper and lower bracket locations 346a and 346b are aligned (or are at least approximately aligned) with the vertical axis V, the upper axle location 348a is spaced apart from the vertical plane 366 in a first lateral direction, and the lower axle location 348b is spaced apart from the vertical plane 366 in a second lateral direction opposite to the first lateral direction. Embodiments of this control arm arrangement can provide a number of advantages. For example, positioning the first end portions 326a and 328a of the upper and lower control arms 232a and 234a, respectively, in the same vertical plane can facilitate attachment of both control arms to a single hanger bracket 224a. This feature can also enable a simplified hanger bracket design. Additionally, attaching the second end portions 327a and 329a of the upper and lower control arms 232a and 234a, respectively, to the axle 220 at laterally spaced apart locations tends to triangulate the side loads on the axle 220 and provide greater lateral support than would otherwise be provided with, for example, a system of coplanar control arms.

In another aspect of the illustrated embodiment, the first lift spring 250a is generally positioned between the first upper control arm 232a and the first lower control arm 234a. More specifically, as shown in FIG. 3B, the upper control arm 232a includes an aft lift spring mounting pad 362a, and the lower control arm 234a includes a forward lift spring mounting pad 364a. The forward and aft lift spring mounting pads 362a and 364a include coplanar faces for attachment to the opposing end portions of the lift spring 250a. In some embodiments, the individual control arms 232a and 234a can be unitary structural members, and the mounting pads 362a and 364a can be integrally formed as part of the corresponding control arm. By way of example, the control arms 232a and 234a can be formed by casting, forging, and/or machining from steel, aluminum, and/or other metals. Integrally forming the control arms 232a and 234a with a corresponding lift spring mounting pad as a unitary member can reduce the cost of the control arms. In other embodiments, however, the lift spring mounting accommodations can be provided by separate brackets that are structurally fastened to the control arms. In yet other embodiments, the lift spring 250a can be positioned in other operative locations for raising the axle 220 when not in use.

As can be seen with reference to FIG. 3A, in the illustrated embodiment the lift spring 250a includes a central axis 368 that extends parallel to the vertical plane 366 passing through the upper and lower bracket locations 346a and 346b. In the illustrated embodiment, the central axis 368 is offset slightly outboard of the vertical plane 366. Additionally, it can be seen that the upper axle location 348a is spaced apart from a vertical plane passing through the central axis 368 in a first lateral direction (i.e., outboard), and the lower axle location 348b is spaced apart from the vertical plane passing through the central axis 368 in a second lateral direction, opposite to the first lateral direction (i.e., inboard). In other embodiments, however, it is contemplated that the central axis 368 of the lift spring 250a can be aligned with the vertical plane 366, offset to the inboard side of the vertical plane 366, and/or non-parallel to the vertical plane 366. Additionally, although the upper axle location 348a is positioned further outboard from the longitudinal axis L of the vehicle than the lower axle location 348b in the illustrated embodiment, in other embodiments these locations can be reversed and the lower axle location 348b can be positioned further outboard than the upper axle location 348a. With either of these configurations, the lateral offset of the second end portions 327a and 329a can increase the lateral stability and strength provided by the upper and lower control arms 232a and 234a, respectively.

Figure 4A:
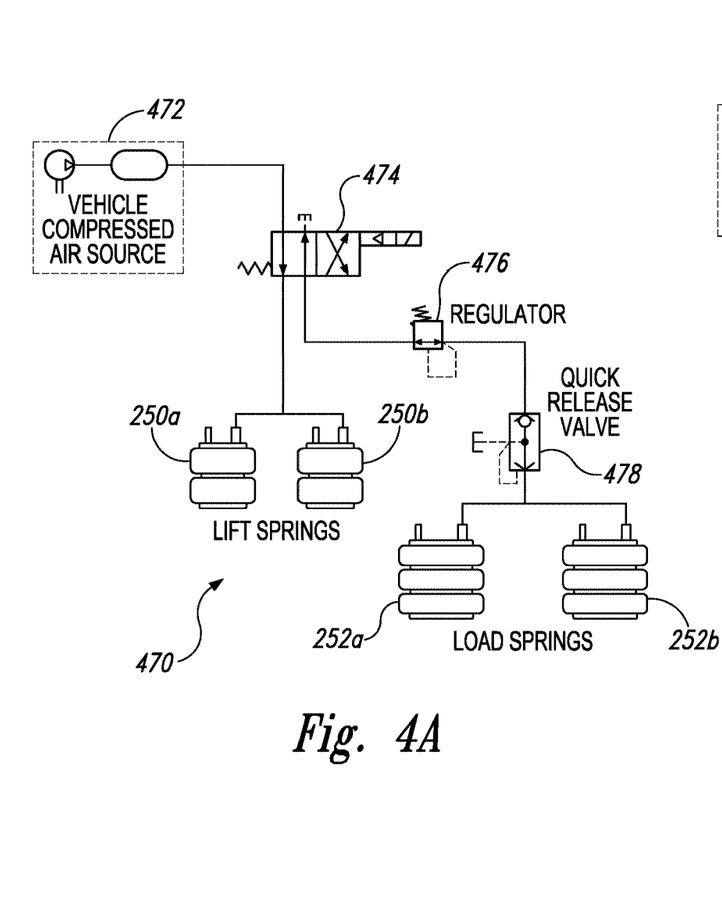
FIGS. 4A and 4B are schematic diagrams of an air control kit for raising and lowering the lift axle of FIGS. 2A-3B in accordance with an embodiment of the present technology.
Figure 4B:
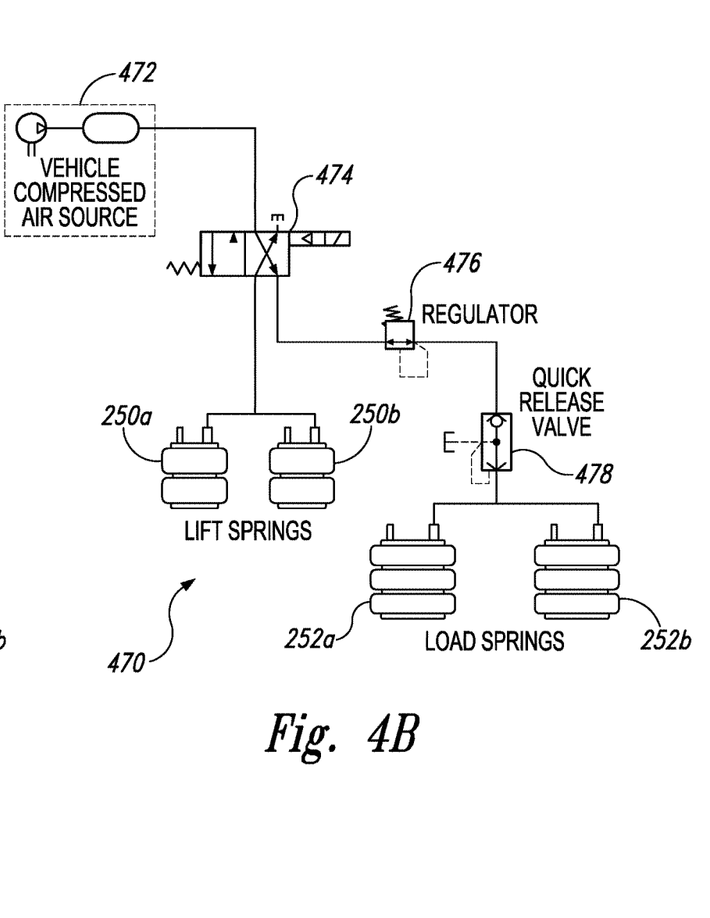

FIGS. 4A and 4B are partially schematic diagrams of a suitable air control kit 470 for operating the lift axle system 110 described above with reference to FIGS. 1-3B. Referring first to FIG. 4A, the air kit 470 includes a valve 474 that receives compressed air at "system pressure" from a vehicle compressed air source 472. In some embodiments, the system pressure can range from about 115 psi to about 150 psi, depending on the vehicle's compressed air system. The valve 474 is a four port, two position valve, commonly referred to as a "4/2 valve," that is activated by a manual switch, such as a rocker-type switch, that can be activated by a vehicle operator to raise and lower the lift axle system 110. In the de-energized state shown in FIG. 4A, the valve 474 provides compressed air to the lift springs 250a, b. In the energized state shown in FIG. 4B, the valve 472 provides pressurized air to the load springs 252a, b via a pressure regulator 476 and a quick release valve 478.

To raise the lift axle system 110 from the lowered position generally depicted in FIGS. 1 and 3B, the valve 474 is de-energized so that pressurized air flows from the compressed air source 472 to the valve 474 and then to the lift springs 250a, b. Concurrently, air pressure in the conduit leading from the valve 474 to the pressure regulator 476 is exhausted through the valve 474. This causes a pressure drop in the conduit, which activates the quick release valve 478 and causes it to drain pressurized air from the load springs 252a, b. As the pressurized air flows into the lift springs 250a, b, they inflate and extend, thereby raising the axle 220 via counterclockwise rotation of the upper and lower control arms 232a, b and 234a, b about the respective hanger brackets 224a, b as viewed from the perspective of FIG. 3B. Simultaneously, pressurized air drains from the load springs 252a, b, and they are compressed as the axle 220 retracts upwardly toward the frame rails 102a, b (FIG. 2A).

Referring next to FIGS. 2A and 4B together, to lower the lift axle system 110 the valve 474 is energized so that system pressure air passes from the compressed air source 472 through the valve 474 and to the pressure regulator 476. The pressure regulator 476 can be set to a desired "regulated pressure" that is lower than the system pressure so that the primary suspension load on the axle 220 is under the rated load determined by the lift axle manufacturer. Air at the regulated pressure passes from the regulator 476 to the quick release valve 478. The quick release valve 478 permits the free flow of pressurized air from the regulator 476 to the load springs 252a, b. As the load springs 252a, b inflate and expand from the compressed state, the axle 220 moves downwardly, thereby compressing the lift springs 250a, b and causing pressurized air in the lift springs 250a, b to be exhausted through the valve 474. Extension of the load springs 252a, b and corresponding contraction of the lift springs 250a, b causes the axle 220 to move downwardly and away from the frame members 102a, b toward the lowered position shown in FIG. 1. The air kit 470 is one example of an air control kit for use with lift axles, such as the STANDARD AIR CONTROL KIT, Part No. 13501004, provided by Link Manufacturing, Ltd, Sioux Center, Iowa 51250. Other air kits can be used with the lift axle system 110 described above, such as one or more of the air kits disclosed in U.S. Provisional Patent Application No. 62/456,566, filed Feb. 8, 2017, and titled "AUXILIARY SUSPENSION AIR DAMPING SYSTEMS AND ASSOCIATED METHODS OF MANUFACTURE AND USE," which is incorporated herein by reference in its entirety. As those of ordinary skill in the art will appreciate, in other embodiments other air control kits or other systems may be implemented to raise and lower the axle 220. Accordingly, the control arm arrangement and other aspects of the lift axle systems described herein are not limited to use with any particular air kit.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A lift axle system for use with a vehicle, the vehicle having a longitudinal axis, a lateral axis, and a vertical axis, the lift axle system comprising:
   a bracket configured to be attached to a chassis of the vehicle;
   an axle;
   an upper control arm having a first end portion spaced apart from a second end portion, wherein the first end portion of the upper control arm is pivotally attached to the bracket at an u per bracket location, and wherein the second end portion of the upper control arm is pivotally attached to the axle at an upper axle location; and
   a lower control arm having a first end portion spaced apart from a second end portion, wherein the first end portion of the lower control arm is pivotally attached to the bracket at a lower bracket location, and wherein the second end portion of the lower control arm is pivotally attached to the axle at a lower axle location,
   wherein the upper and lower bracket locations lie in a vertical plane that extends parallel to the vertical and longitudinal axes of the vehicle,
   wherein the upper and lower bracket locations are in vertical alignment along the vertical axis; and
   wherein the upper axle location is spaced apart from the lower axle location in a lateral direction that extends parallel to the lateral axis of the vehicle.

2. The lift axle system of claim 1 wherein the upper axle location is spaced apart from the vertical plane in a first lateral direction, and wherein the lower axle location is spaced apart from the vertical plane in a second lateral direction, opposite to the first lateral direction.

3. The lift axle system of claim 1 wherein the upper axle location is positioned further outboard from the longitudinal axis of the vehicle than the lower axle location.

4. The lift axle system of claim 1 wherein:
   the bracket has a first sidewall spaced apart from a second sidewall,
   the first end portion of the upper control arm is positioned between the first and second sidewalls and pivotally attached thereto by a first pivot pin, and
   the first end portion of the lower control arm is positioned between the first and second sidewalls and pivotally attached thereto by a second pivot pin.

5. The lift axle system of claim 1, further comprising a lift spring operable to raise the axle toward the vehicle chassis, the lift spring having a first end portion spaced apart from a second end portion, wherein
   the upper control arm includes a first lift spring mount,
   the lower control arm includes a second lift spring mount,
   the first end portion of the lift spring is attached to the first lift spring mount, and
   the second end portion of the lift spring is attached to the second lift spring mount.

6. The lift axle system of claim 1, further comprising a lift spring operable to raise the axle toward the vehicle chassis, the lift spring having a first end portion operably coupled to the lower control arm and a second end portion operably coupled to the upper control arm.

7. The lift axle system of claim 6 wherein at least a portion of the lift spring is positioned between the upper control arm and the lower control arm.

8. The lift axle system of claim 6 wherein the lift spring has a central axis, and wherein central axis extends parallel to the vertical plane.

9. The lift axle system of claim 1 wherein the vertical plane is a first vertical plane, and wherein the lift axle system further comprises a lift spring operable to raise the axle toward the vehicle chassis, the lift spring having a central axis that lies in a second vertical plane that extends parallel to the vertical axis,
   wherein the upper axle location is spaced apart from the second vertical plane in a first lateral direction, and
   wherein the lower axle location is spaced apart from the second vertical plane in a second lateral direction, opposite to the first lateral direction.

10. The lift axle system of claim 9 wherein the second vertical plane is parallel to the first vertical plane.

11. A lift axle system for use with a vehicle, the vehicle having a longitudinal axis, a lateral axis, and a vertical axis, the lift axis system comprising:
    a bracket configured to be attached to a chassis of the vehicle;
    an axle;
    an upper control arm having a first end portion spaced apart from a second end portion, wherein the first end portion of the upper control arm is pivotally attached to the bracket at an upper bracket location, and wherein the second end portion of the upper control arm is pivotally attached to the axle at an upper axle location; and a lower control arm having a first end portion spaced apart from a second end portion, wherein the first end portion of the lower control arm is pivotally attached to the bracket at a lower bracket location and wherein the second end portion of the lower control arm is pivotally attached to the axle at a lower axle location, wherein the upper and lower bracket locations lie in a vertical plane that extends parallel to the vertical and longitudinal axes of the vehicle, wherein the upper axle location is spaced apart from the lower axle location in a lateral direction that extends parallel to the lateral axis of the vehicle, and wherein the lower axle location is positioned further outboard from the longitudinal axis of the vehicle than the upper axle location.

12. The lift axle system of claim 11 wherein the upper axle location is spaced apart from the vertical plane in a first lateral direction, and wherein the lower axle location is spaced apart from the vertical plane in a second lateral direction, opposite to the first lateral direction.

13. The lift axle system of claim 11 wherein the upper and lower bracket locations are in vertical alignment along the vertical axis.

14. The lift axle system of claim 11 further comprising a lift spring operable to raise the axle toward the vehicle chassis, the lift spring having a first end portion operably coupled to the lower control arm and a second end portion operably coupled to the upper control arm.

15. The lift axle system of claim 14 wherein at least a portion of the lift spring is positioned between the upper control arm and the lower control arm.

16. A lift axle system for use with a vehicle, the vehicle having a longitudinal axis, a lateral axis, and a vertical axis, the lift axle system comprising:

a bracket configured to be attached to a chassis of the vehicle;

an axle;

an upper control arm having a first end portion spaced apart from a second end portion, wherein the first end portion of the upper control arm is pivotally attached to the bracket at an upper bracket location, and wherein the second end portion of the upper control arm is pivotally attached to the axle at an upper axle location;

a lower control arm having a first end portion spaced apart from a second end portion, wherein the first end portion of the lower control arm is pivotally attached to the bracket at a tower bracket location, and wherein the second end portion of the lower control arm is pivotally attached to the axle at a tower axle location, and a lift spring operable to raise the axle toward the vehicle chassis, the lift spring having a first end portion spaced apart from a second end portion, wherein the upper and lower bracket locations lie in a vertical plane that extends parallel to the vertical and longitudinal axes of the vehicle, wherein the upper axle location is spaced apart from the lower axle location in a lateral direction that extends parallel to the lateral axis of the vehicle, wherein the upper control arm is a unitary structure that includes a first lift spring mount, wherein the lower control arm is a unitary structure that includes a second lift spring mount, wherein the first end portion of the lift spring is attached to the first lift spring mount, and wherein the second end portion of the lift spring is attached to the second lift spring mount.

17. The lift axle system of claim 16 wherein the upper and lower bracket locations are in vertical alignment along the vertical axis.

18. The lift axle system of claim 16 wherein the upper axle location is positioned further outboard from the longitudinal axis of the vehicle than the lower axle location.

19. The lift axle system of claim 16 wherein the lift spring has a central axis, and wherein central axis extends parallel to the vertical plane.

20. The lift axle system of claim 16 wherein the lift spring has a central axis, and wherein central axis extends at an angle to the vertical plane.

* * * * *

UNITED STATES PATENT AND TRADEMARK OFFICE
CERTIFICATE OF CORRECTION

PATENT NO. : 10,569,814 B2
APPLICATION NO. : 15/701369
DATED : February 25, 2020
INVENTOR(S) : Gregory Wayne Hulstein et al.

Page 1 of 1

It is certified that error appears in the above-identified patent and that said Letters Patent is hereby corrected as shown below:

In the Claims

In Column 9, Line 54, in Claim 1, delete "u per" and insert -- upper --, therefor.

In Column 10, Line 57, in Claim 11, delete "axis" and insert -- axle --, therefor.

In Column 11, Line 4, in Claim 11, delete "location" and insert -- location, --, therefor.

In Column 11, Line 24, in Claim 14, delete "claim 11" and insert -- claim 11, --, therefor.

In Column 12, Line 7, in Claim 16, delete "tower" and insert -- lower --, therefor.

In Column 12, Line 9, in Claim 16, delete "tower" and insert -- lower --, therefor.

Signed and Sealed this
Fourteenth Day of July, 2020

Andrei Iancu
*Director of the United States Patent and Trademark Office*